(12) United States Patent
Matsumoto

(10) Patent No.: US 11,594,869 B2
(45) Date of Patent: Feb. 28, 2023

(54) LIGHTNING SUPPRESSION TYPE LIGHTNING DISCHARGER AND ARRESTER

(71) Applicant: LIGHTNING SUPPRESSION SYSTEMS CO., LTD., Kanagawa (JP)

(72) Inventor: Toshio Matsumoto, Kanagawa (JP)

(73) Assignee: LIGHTNING SUPPRESSION SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 17/882,338

(22) Filed: Aug. 5, 2022

(65) Prior Publication Data

US 2022/0376485 A1    Nov. 24, 2022

Related U.S. Application Data

(66) Division of application No. 16/759,662, filed on Apr. 27, 2020, now Pat. No. 11,451,040, Substitute for application No. PCT/JP2018/014665, filed on Apr. 6, 2018.

(30) Foreign Application Priority Data

Oct. 31, 2017 (JP) .................. 2017-211047

(51) Int. Cl.
    *H02G 13/00*    (2006.01)

(52) U.S. Cl.
    CPC ............. *H02G 13/40* (2013.01); *H02G 13/80* (2013.01)

(58) Field of Classification Search
    CPC .............................. H02G 13/40; H02G 13/80
    See application file for complete search history.

(56) References Cited

U.S. PATENT DOCUMENTS

| 2004/0140121 A1* | 7/2004 | Rodriguez Montes ...................... H02G 13/80 174/137 R |
| 2010/0284118 A1* | 11/2010 | Chung .................. H02G 13/60 361/117 |
| 2016/0285248 A1* | 9/2016 | Maldonado Pardo . H02G 13/80 |

* cited by examiner

*Primary Examiner* — Pete T Lee
(74) *Attorney, Agent, or Firm* — Calfee Halter & Griswold LLP

(57) ABSTRACT

A region of a positive charge formed around an arrester is made as small as possible to effectively suppress generation of an upward streamer.

An inner electrode body 2 to be grounded, an outer electrode body 3 provided to surround the inner electrode body with a predetermined gap G, an electrical insulating layer S provided in the gap to hold the inner electrode body and the outer electrode body in an electrically insulated state, and a support 4 that supports at least one of the inner electrode body and the outer electrode body are included, in which the inner electrode body is formed in a rod shape, and the outer electrode body is formed in a cylindrical shape.

19 Claims, 8 Drawing Sheets

LIGHTNING SUPPRESSION TYPE LIGHTNING DISCHARGER AND ARRESTER

CROSS-REFERENCE TO RELATED APPLICATIONS

This application is a divisional of U.S. application Ser. No. 16/759,662, filed Apr. 27, 2020, which is a 371 of PCT Application No. PCT/JP2018/014655 filed on Apr. 6, 2018, which claims priority to Japanese Application No. 2017-211047, filed on Oct. 31, 2017, the contents of which are hereby incorporated by reference as if recited in their entirety.

TECHNICAL FIELD

The present invention relates to a lightning suppression type lightning discharger and an arrester for protecting a protected object such as a building or equipment from lightning damage by suppressing lightning.

BACKGROUND ART

Lightning is a discharge phenomenon that occurs in the atmosphere. Lightning discharges include intra-cloud discharge, inter-cloud discharge, and cloud-to-ground discharge. Of lightning discharges, cloud-to-ground discharge (hereinafter lightning) causes heavy damage. Lightning is a phenomenon that occurs when the electric field strength between a thundercloud (cloud base) and the ground or a structure built on the ground becomes extremely large, and an electric charge thereof becomes saturated to destroy the insulation of the atmosphere.

A close look at the phenomenon of lightning shows that, in the case of general lightning in summer (summer lightning), as the thundercloud matures, a stepped leader approaches the ground from the thundercloud while selecting a place where the atmosphere is easily discharged.

When the stepped leader is at a certain distance from the ground, an upward streamer (greeting discharge) of a weak current extends from the ground, a building (lightning rod), a tree, etc. toward the stepped leader.

When the streamer and the stepped leader are combined, a large current (feedback current) flows between the thundercloud and the ground through a path thereof.

This phenomenon is the lightning phenomenon.

With respect to such a lightning phenomenon, most of conventional lightning protection concepts correspond to a scheme in which a lightning strike is received by a rod-type lightning rod (Franklin rod) and sent to the ground from a viewpoint that lightning may not be prevented.

On the other hand, the present inventors have proposed a lightning suppression type arrester disclosed in Patent Document 1 to protect a protected object by minimizing the occurrence of lightning.

This lightning suppression type arrester has an upper electrode body and a lower electrode body disposed with an insulator interposed therebetween, and is configured by grounding only the lower electrode body.

Further, for example, when a thundercloud in which a negative charge is distributed on the cloud base approaches, an opposite charge (positive charge) is distributed on the surface of the ground, and a positive charge is collected on the grounded lower electrode body.

Then, the upper electrode body disposed via the insulator is negatively charged by an action of a capacitor.

By this action, generation of an upward streamer in and around the arrester is made less likely to occur to suppress the occurrence of lightning.

CITATION LIST

Patent Document

Patent Document 1: JP 5839331 B1

SUMMARY OF THE INVENTION

Problem to be Solved by the Invention

According to the above-mentioned proposal by the present inventors, lightning can be suppressed in a circular protection region centered on the arrester.

However, in the above proposal, since a region of positive charge is formed in the lower electrode body corresponding to a lower structure of the arrester, lightning on the lower electrode body may be assumed depending on the energy of lightning. Thus, it has been found that it is necessary to narrow the above-described region of the positive charge as much as possible.

Means for Solving Problem

The invention has been made based on the above findings, and includes an inner electrode body to be grounded, an outer electrode body provided to surround the inner electrode body with a predetermined gap, an electrical insulating layer provided in the gap to hold the inner electrode body and the outer electrode body in an electrically insulated state, and a support that supports at least one of the inner electrode body and the outer electrode body, in which the inner electrode body is formed in a rod shape or a cylindrical shape, and the outer electrode body is formed in a cylindrical shape.

By adopting such a configuration, it is possible to obtain a lightning suppression type lightning discharger in which almost the entire inner electrode body to be grounded is covered with the outer electrode body and the outer electrode body is disposed in an electrically insulated state with respect to the inner electrode body.

The lightning suppression type lightning discharger having such a configuration is installed at a place where lightning is to be suppressed by the support, and is used as a lightning suppression type arrester with the inner electrode body grounded to the ground via this support.

Further, when a thundercloud in which a negative charge is distributed on the cloud base approaches, an opposite charge (positive charge) is distributed on the surface of the ground, and a positive charge is collected on the inner electrode body grounded to the ground.

Then, the outer electrode body disposed on the inner electrode body via an electrical insulating layer is negatively charged by an action of a capacitor.

By this action, it is possible to make it difficult for an upward streamer to be generated in and around the outer electrode body, and to suppress the occurrence of lightning.

Here, since the rod-shaped or cylindrical inner electrode body is entirely wrapped by the cylindrical outer electrode body, most of the region around the arrester is covered with negative charges.

Accordingly, a positive charge region in the arrester is kept significantly small, and generation of the upward streamer when approaching the thundercloud can be effectively suppressed. As a result, it is possible to enhance the lightning suppression effect.

In the lightning suppression type lightning discharger of the invention, the support can radially penetrate the outer electrode body to protrude to an inside thereof and be coupled to the inner electrode body positioned inside the outer electrode body in an electrically conductive state, and a spacer made of an electrically insulating material for supporting the outer electrode body on the support can be interposed in a penetrating portion between the support and the outer electrode body.

By adopting such a configuration, in a state in which the lightning suppression type arrester is configured using the support, the outer electrode body can be held in a substantially horizontal state, and an upper part of the support can be covered with the outer electrode body.

In this way, it is possible to ensure a large negative charge region formed by the outer electrode body in a horizontal direction, and to cover and hide the positively charged support with the negative charge region.

As a result, by covering the positive charge region of the lightning suppression type arrester with the wide negative charge region, it is possible to more effectively suppress generation of the upward streamer toward the cloud base.

In the lightning suppression type lightning discharger of the invention, the support can be inserted into the outer electrode body from one longitudinal end thereof and coupled to the inner electrode body positioned inside the outer electrode body in an electrically conductive state, and a spacer made of an electrically insulating material for supporting the outer electrode body on the support can be interposed between one end of the outer electrode body and the support.

By adopting such a configuration, in a state in which the lightning suppression type arrester is configured using the support, the outer electrode body can be held in a substantially vertical state.

In this way, by the outer electrode body, it is possible to ensure a negative charge region largely extending in the vertical direction above the positively charged support.

As a result, by covering the positive charge region of the lightning suppression type arrester with the wide negative charge region, it is possible to effectively suppress generation of the upward streamer toward the cloud base.

In the invention, the electrical insulating layer is formed by spacers made of an electrically insulating material interposed between both ends of the inner electrode body and the outer electrode body, and a space portion formed by the spacers, the inner electrode body, and the outer electrode body.

Alternatively, the electrical insulating layer is formed by a spacer made of an electrically insulating material interposed in a gap between the inner electrode body and the outer electrode body.

In addition, it is possible to adopt a configuration in which a through-hole is formed in the side wall of the outer electrode body to communicate an inside and an outside thereof.

By adopting such a configuration, when the pressure in the gap formed between the inner electrode body and the outer electrode body increases, gas in the gap can be released to the outside by the through-hole to prevent each component member from being damaged due to the increase in the internal pressure described above.

Effect of the Invention

According to the arrester using the lightning suppression type lightning discharger of the invention, the region of the positive charge formed around the arrester is made as small as possible to effectively suppress generation of the upward streamer. In this way, it is possible to enhance the lightning suppression effect.

In addition, according to the lightning discharger of the invention, in addition to the above effect, it is possible to simplify a structure, reduce the weight, and to improve manufacturability.

MODE(S) FOR CARRYING OUT THE INVENTION

Hereinafter, a first embodiment of the invention will be described with reference to FIG. 1 to FIG. 3.

Figure 1:
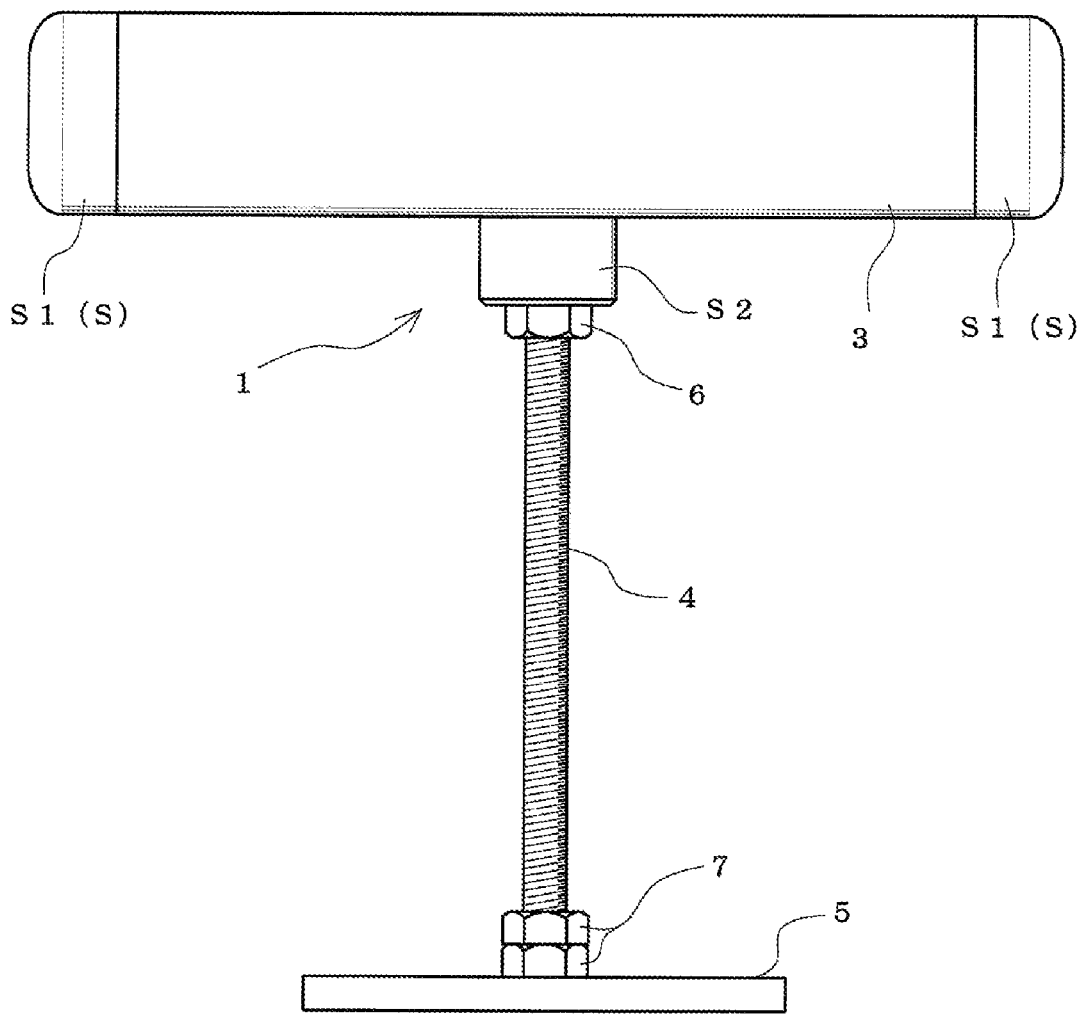
FIG. 1 is a front view illustrating a first embodiment of a lightning suppression type lightning discharger of the invention.

In FIG. 1, reference numeral 1 denotes a lightning suppression type lightning discharger (hereinafter abbreviated as lightning discharger) according to the present embodiment. Note that in embodiments of the invention, as illustrated in FIG. 1 and FIG. 2, the lightning discharger refers to a configuration in a state in which an inner electrode body is not grounded. In addition, as illustrated in FIG. 3, an arrester refers to a configuration in which an inner electrode body of a lightning discharger 1 is grounded via a support, etc. and can exhibit a lightning protection function.

Figure 2:
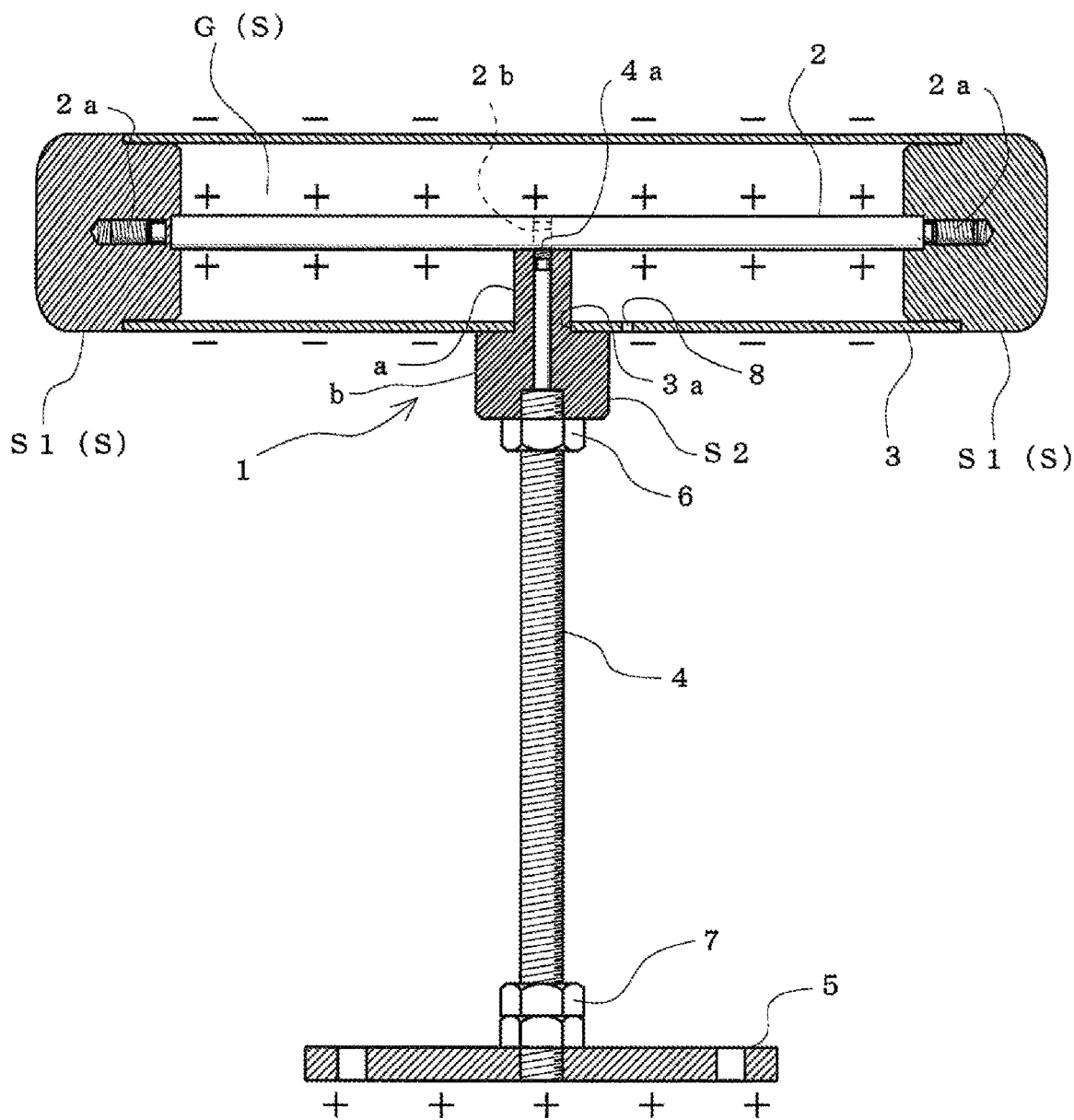
FIG. 2 is a longitudinal sectional view illustrating the first embodiment of the lightning suppression type lightning discharger of the invention.

As described in detail in FIG. 2, a lightning discharger 1 of the present embodiment includes an inner electrode body 2, an outer electrode body 3 provided to surround the inner electrode body 2 with a predetermined gap G, and an electrical insulating layer S for holding the inner electrode body 2 and the outer electrode body 3 in an electrically insulated state.

The inner electrode body 2 is formed in a rod shape, and the outer electrode body 3 is formed in a cylindrical shape that covers the inner electrode body 2 over an entire length in a longitudinal direction. Both the electrode bodies are made of stainless steel, which is an excellent conductor. The inner electrode body 2 is not limited to the rod shape, and may be formed in a cylindrical shape.

In the present embodiment, the electrical insulating layer is disposed at both ends of the inner electrode body 2 and the outer electrode body 3, and includes a pair of spacers S1 formed of an electrically insulating material that holds these electrode bodies at a predetermined interval, and a space portion of the gap G formed by the spacer S1, the inner electrode body 2, and the outer electrode body 3. This gap G is appropriately set according to a required lightning suppression function.

The inner electrode body 2 has screw portions 2a formed at both ends thereof, and each spacer S1 fit and locked to both ends of the outer electrode body 3 is screwed respectively.

In this state, a part of each spacer S1 is fit to each end of the outer electrode body 3, and is held in a state of being in contact with each end surface of the outer electrode body 3.

In this way, the inner electrode body 2 is concentrically held at a center position of the outer electrode body 3 and is held in a state of being electrically insulated from the outer electrode body 3 by the electrical insulating layer S formed by each spacer S1 and an air layer of the gap G.

An insertion hole 3a is formed in a side wall of the outer electrode body 3 at a substantially middle portion in a longitudinal direction thereof, and one end of the support 4 electrically connected to the inner electrode body 2 is inserted into the outer electrode body 3 through the insertion hole 3a.

A screw portion 4a is formed at one end of the support 4 inserted into the outer electrode body 3, and the support 4 is connected to the inner electrode body 2 by the screw portion 4a screwed to a female screw portion 2b formed in the inner electrode body 2 along a radial direction thereof.

In addition, a fixing plate 5 is attached to the other end of the support 4, and the lightning discharger 1 of the present embodiment is fixed to an installation position via the plate 5. Note that the fixing plate 5 may be fixed to a cylindrical member (not illustrated) for height adjustment, etc.

In addition, the support 4 and the plate 5 are formed by an excellent conductor, and as described above, the inner electrode body 2 is grounded by being grounded to the ground in a state where the plate 5 is fixed to the installation position.

Further, a spacer S2 formed of an electrically insulating material is interposed in the insertion hole 3a to fill a gap between the outer electrode body 3 and the support 4 and to maintain an electrically insulated state therebetween.

The spacer S2 has a small-diameter portion a inserted into the insertion hole 3a and brought into contact with a side surface of the inner electrode body 2, and a large-diameter portion b brought into contact with an outer surface of the outer electrode body 3.

In FIG. 1 and FIG. 2, reference numeral 6 denotes a lock nut screwed to the support 4 to press the spacer S2 toward the outer surface of the outer electrode body 3. Reference numeral 7 denotes a lock nut for fixing the support 4 to the plate 5.

Meanwhile, a through-hole 8 is formed in the side wall of the outer electrode body 3 to communicate the inside and the outside thereof, and an outflow of gas from the through-hole 8 suppresses a pressure increase in the outer electrode body 3.

Figure 3:
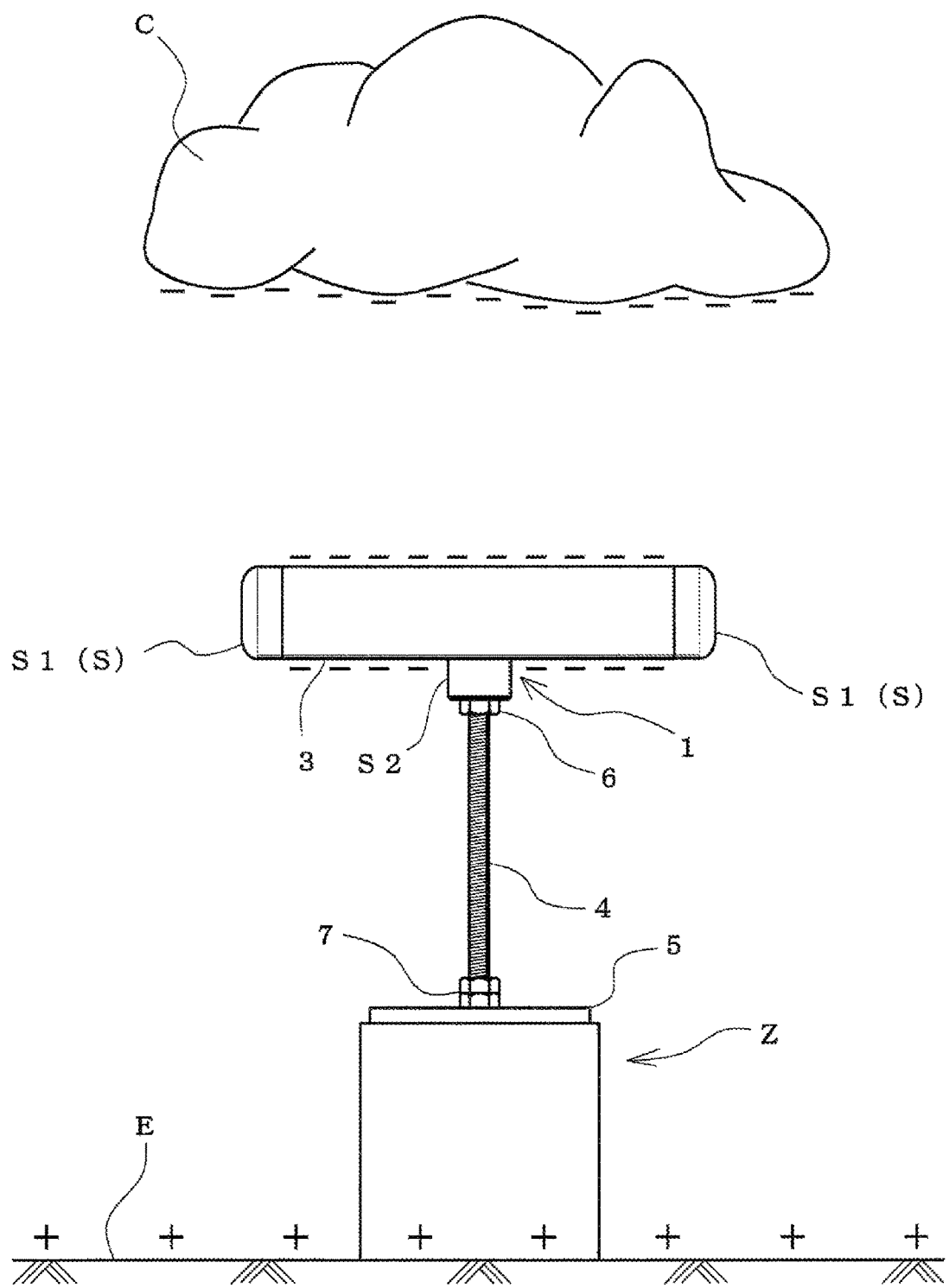
FIG. 3 is a schematic diagram for describing a streamer generation suppressing action in an arrester using the first embodiment of the lightning suppression type lightning discharger of the invention.

The lightning discharger 1 of the present embodiment configured as described above is installed on or near a protected object to be protected from lightning using the support 4, the plate 5, an additional support member (a connecting rod-like member or a cylindrical member), a long member, etc. and included in an arrester Z as illustrated in FIG. 3.

In this state, the support 4 is grounded to a ground E directly or via a ground wire, etc.

Next, a description will be given of a lightning suppression function by the arrester Z of the present embodiment installed as described above.

As illustrated in FIG. 3, when a thundercloud C in which a negative charge is distributed on the cloud base approaches, an opposite charge (positive charge) is distributed on a surface of the ground E, and a positive charge is collected on the inner electrode body 2 grounded to the ground E via the support 4 as illustrated in FIG. 2.

Meanwhile, the outer electrode body 3 opposed to the inner electrode body 2 via the electrical insulating layer S is negatively charged by an action of a capacitor.

By this action, generation of an upward streamer in and around the outer electrode body 3 is less likely to occur, and as a result, occurrence of lightning is suppressed.

Further, since the outer electrode body 3 is provided to cover substantially the entire circumference of the inner electrode body 2, most of an upper end of the arrester Z of the present embodiment is negatively charged.

In addition, in the present embodiment, since the outer electrode body 3 is held in a substantially horizontal state, a region of negative ions is widely formed in a horizontal direction, and the support 4 bearing positive ions is covered with the negative ion region.

In this way, it is possible to significantly reduce a region of positive charges causing an upward streamer, and to greatly improve the lightning suppression effect.

Figure 4:
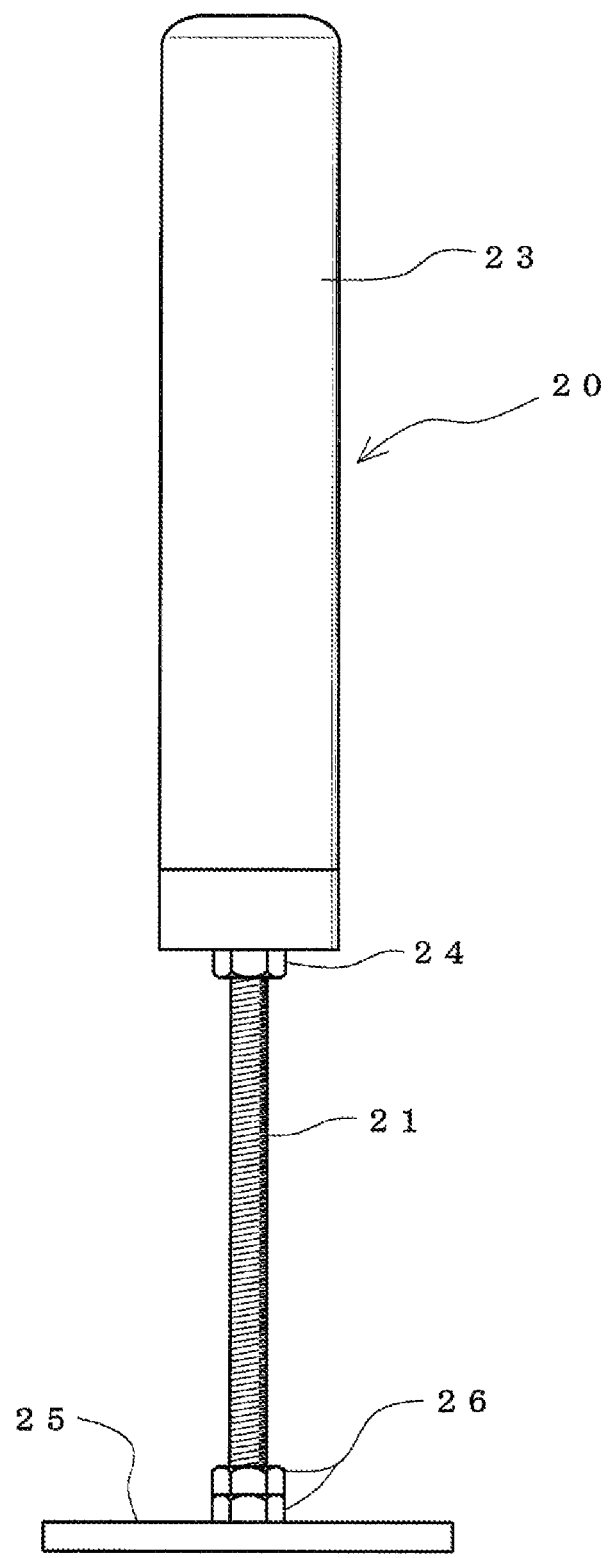
FIG. 4 is a front view illustrating a second embodiment of a lightning suppression type lightning discharger of the invention.
Figure 5:
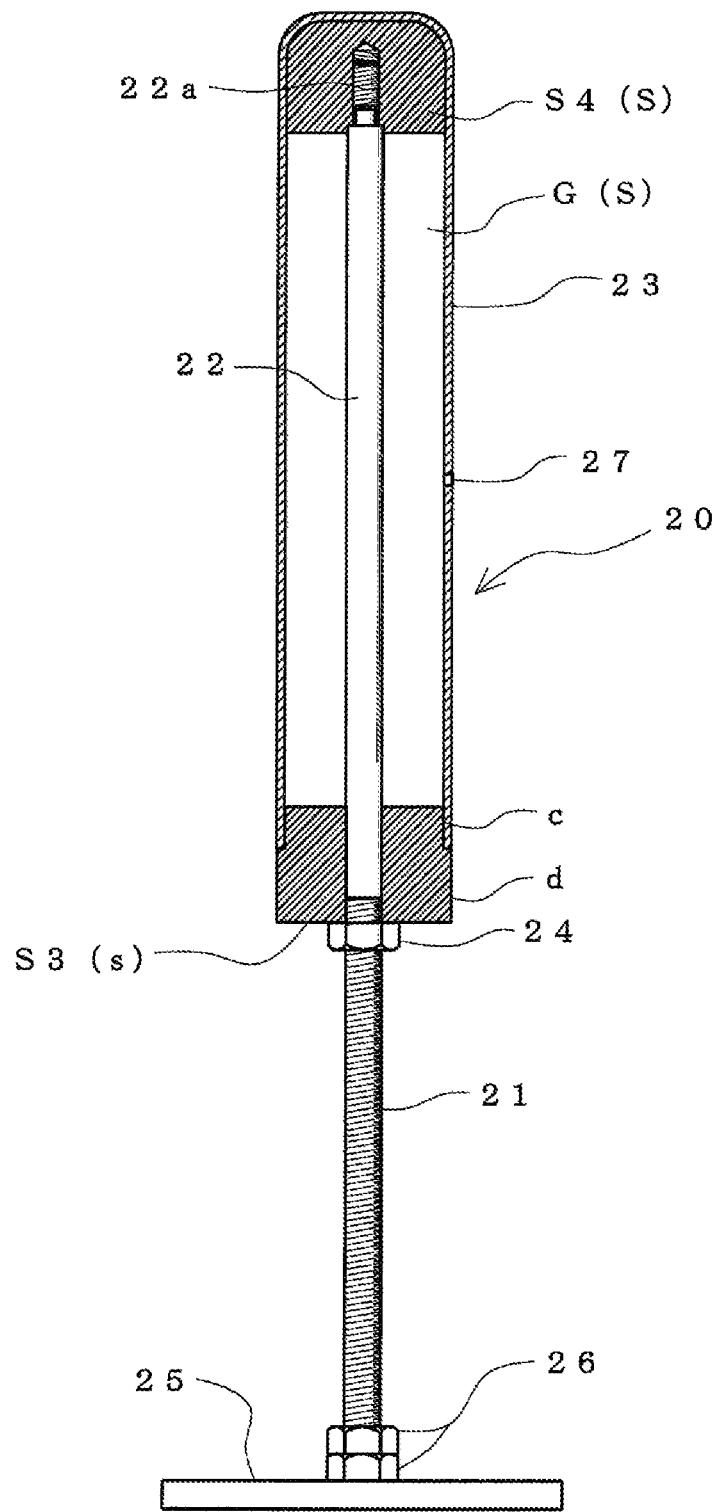
FIG. 5 is a longitudinal sectional view illustrating the second embodiment of the lightning suppression type lightning discharger of the invention.

FIG. 4 and FIG. 5 illustrate a second embodiment of the invention.

A lightning discharger of the present embodiment denoted by reference numeral 20 in these figures is configured such that a support 21 serving as an installation member is inserted into an outer electrode body 23 from one longitudinal end of the outer electrode body 23 formed by an excellent conductor and coupled to an inner electrode body 22 formed by an excellent conductor positioned inside the outer electrode body 23 in an electrically conductive state, and a spacer S3 made of an electrically insulating material for supporting the outer electrode body 23 on the support 21 is interposed between the one end of the outer electrode body 23 and the support 21.

Specifically, the outer electrode body 23 is formed in a bottomed cylindrical shape, a spacer S4 formed of an electrically insulating material is integrally built in on an inner bottom portion thereof, and one end of the inner electrode body 22 is screwed to the spacer S4 via a screw portion 22a.

In this way, the inner electrode body 22 is held at a central portion of the outer electrode body 23 to form a predetermined interval with the outer electrode body 23.

In addition, the spacer S3 attached to the other end opening of the outer electrode body 23 includes a small-diameter portion c fit inside an opening of the outer electrode body 23 and a large-diameter portion d brought into contact with an end surface of the end of the outer electrode body 23.

Further, in the present embodiment, the inner electrode body 22 and the support 21 are integrally formed in a continuous rod shape, a part located inside the outer electrode body 23 serves as the inner electrode body 22, and a part located outside the outer electrode body 23 serves as the support 21.

Here, the support 21 is positioned to penetrate a center of the spacer S3, and a distal end of the inner electrode body 22 is screwed into a central portion of the spacer S4 fixed to an inner bottom of the outer electrode body 23. In this way, the inner electrode body 22 is held at the central portion of the outer electrode body 23, and a uniform gap G is formed between the inner electrode body 22 and the outer electrode body 23.

Therefore, the electrical insulating layer S in the present embodiment includes both the spacers S3 and S4 and the air layer of the gap G.

In addition, a part forming the support 21 has a full screw structure, and a lock nut 24 and a lock nut 26 are screwed thereto. The lock nut 24 is brought into contact with an outer end surface of the spacer S3 and presses the spacer S3 against the outer electrode body 23. The lock nut 26 is fixing a fixing plate 25 to an outer end of the support 21.

Further, a through-hole 27 is formed in a side wall of the outer electrode body 23 to communicate the inside and the outside thereof and suppress a pressure increase in the gap G. This through-hole 27 has a check valve for preventing water droplets from entering.

A lightning discharger 20 of the present embodiment configured as described above is installed in a protected region protected from lightning using the support 21 or the plate 25, and included in the arrester by grounding the inner electrode body 22 via the support 21 or using a ground wire.

The outer electrode body 23 is disposed along a vertical direction so that the lightning discharger 20 installed in this way extends upward above the support 21.

Further, by the same action as that described in the first embodiment, when the thundercloud C approaches and the ground E is charged with positive ions, the outer electrode body 23 is charged with negative ions.

By a negative ion region formed by the outer electrode body 23, generation of an upward streamer from the protected region where the arrester is installed is suppressed, and lightning is suppressed.

Further, in the arrester using the present embodiment, the outer electrode body 23 is installed vertically upward, the outer electrode body 23 is formed in a bottomed cylindrical shape, and an upper end of the outer electrode body 23 is charged with negative ions. Thus, it is possible to ensure a wide negative ion region.

In this way, it is possible to enhance the lightning suppression effect described above.

Figure 6:
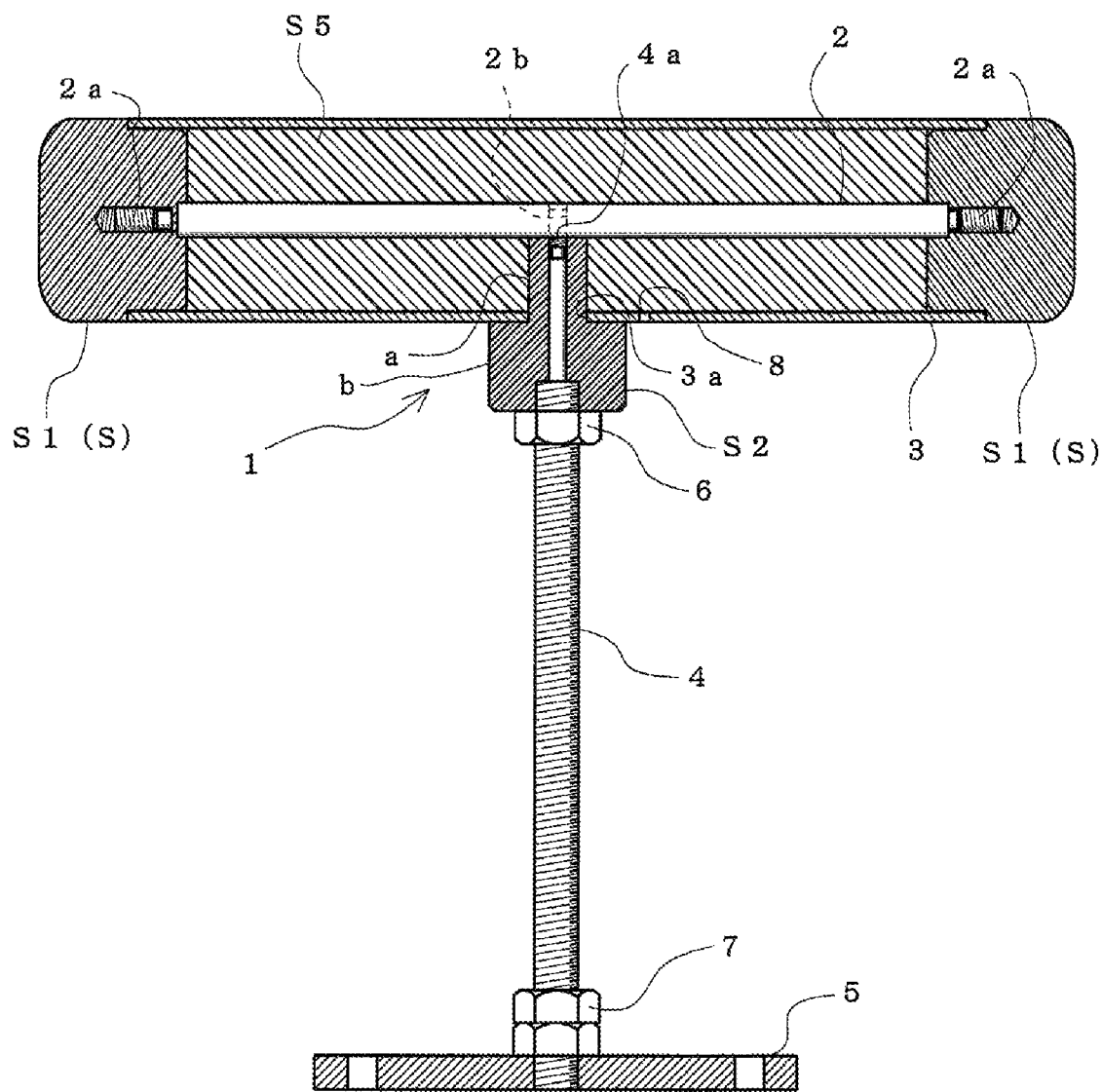
FIG. 6 is a longitudinal sectional view illustrating a third embodiment of a lightning suppression type lightning discharger of the invention.

FIG. 6 illustrates a third embodiment of the invention.

Note that in the figure, basically the same members as those in the third embodiment are denoted by the same reference numerals, and description thereof will be simplified.

In this embodiment, similarly to the embodiment illustrated in FIG. 5, an inner electrode body 22, which also serves as a support 21, an outer electrode body 23, spacers S3 and S4, and a plate (flange) 25 having a bolt hole 25a are provided.

However, in this embodiment, an outer electrode 23 and the support 21 include a metal pipe material made of an integrated excellent conductor. In addition, the outer electrode body 23 is formed by a large-diameter bottomed cylindrical member. Further, an upper end of the inner electrode body 22 is fit into a hole 4a provided in the spacer S4.

In addition, a lower end of the outer electrode body 23 is fit into an annular groove e provided in the spacer S3. Further, all fitting parts including a part where the support 21 and the inner electrode body 22 penetrate the spacer S3 are firmly fixed using an adhesive.

Note that the lightning suppression type lightning discharger of this embodiment can exhibit substantially the same effect as that of the previous embodiment. However, in this embodiment, it is possible to adopt a structure that can further improve manufacturability and reduce the weight.

Note that various shapes, dimensions, etc. of the respective components shown in the above embodiments are merely examples, and can be variously changed based on design requirements, etc.

Figure 7:
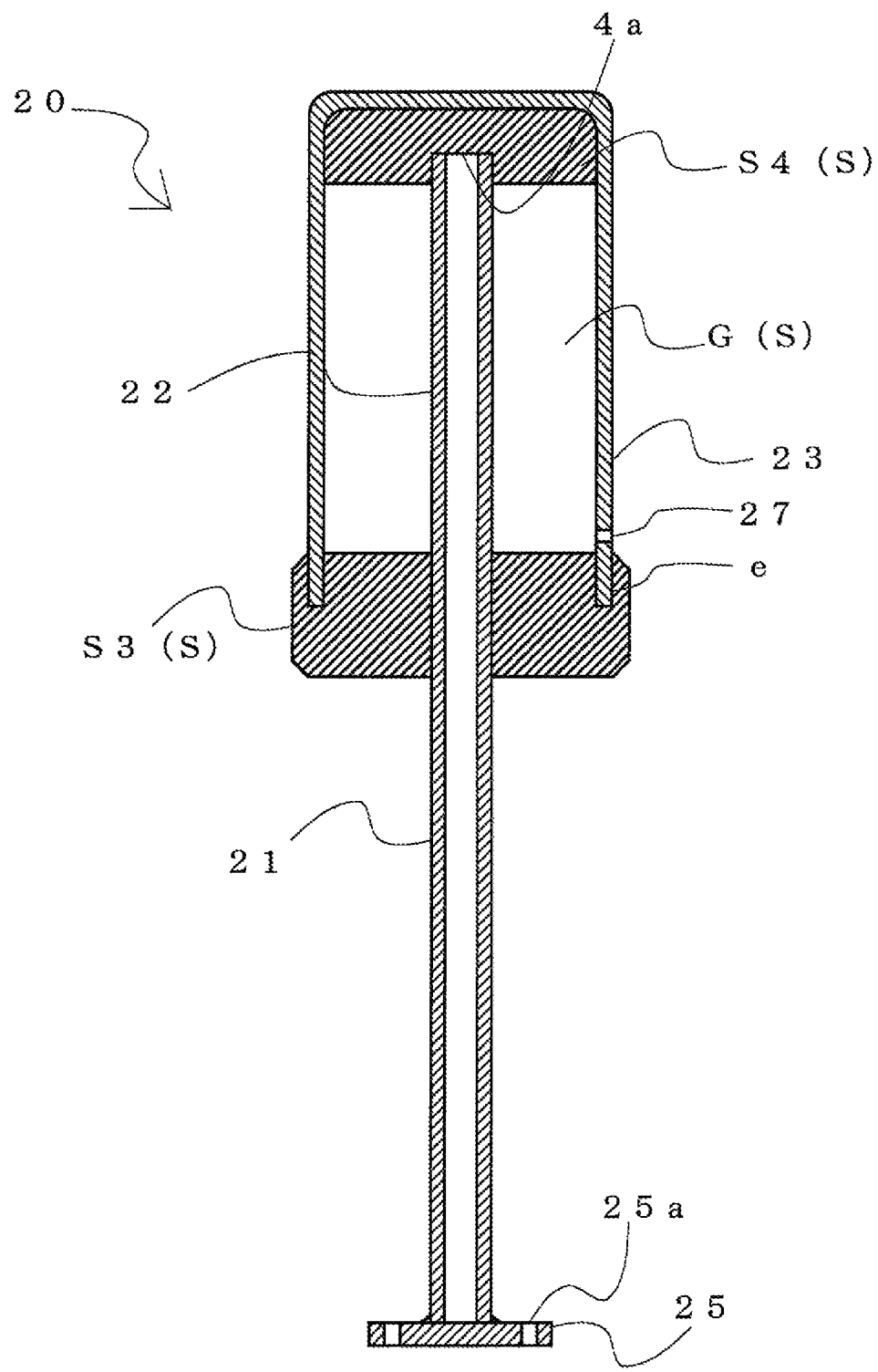
FIG. 7 is a longitudinal sectional view illustrating a fourth embodiment of a lightning suppression type lightning discharger of the invention.

For example, in each of the above-described embodiments, the example in which the air layer of the gap G is used as a component of the electrical insulating layer S has been described. Instead, as illustrated in FIG. 7, a spacer S5 made of an electrically insulating material may be provided to fill the gap G, thereby forming the electrical insulating layer S.

Figure 8:
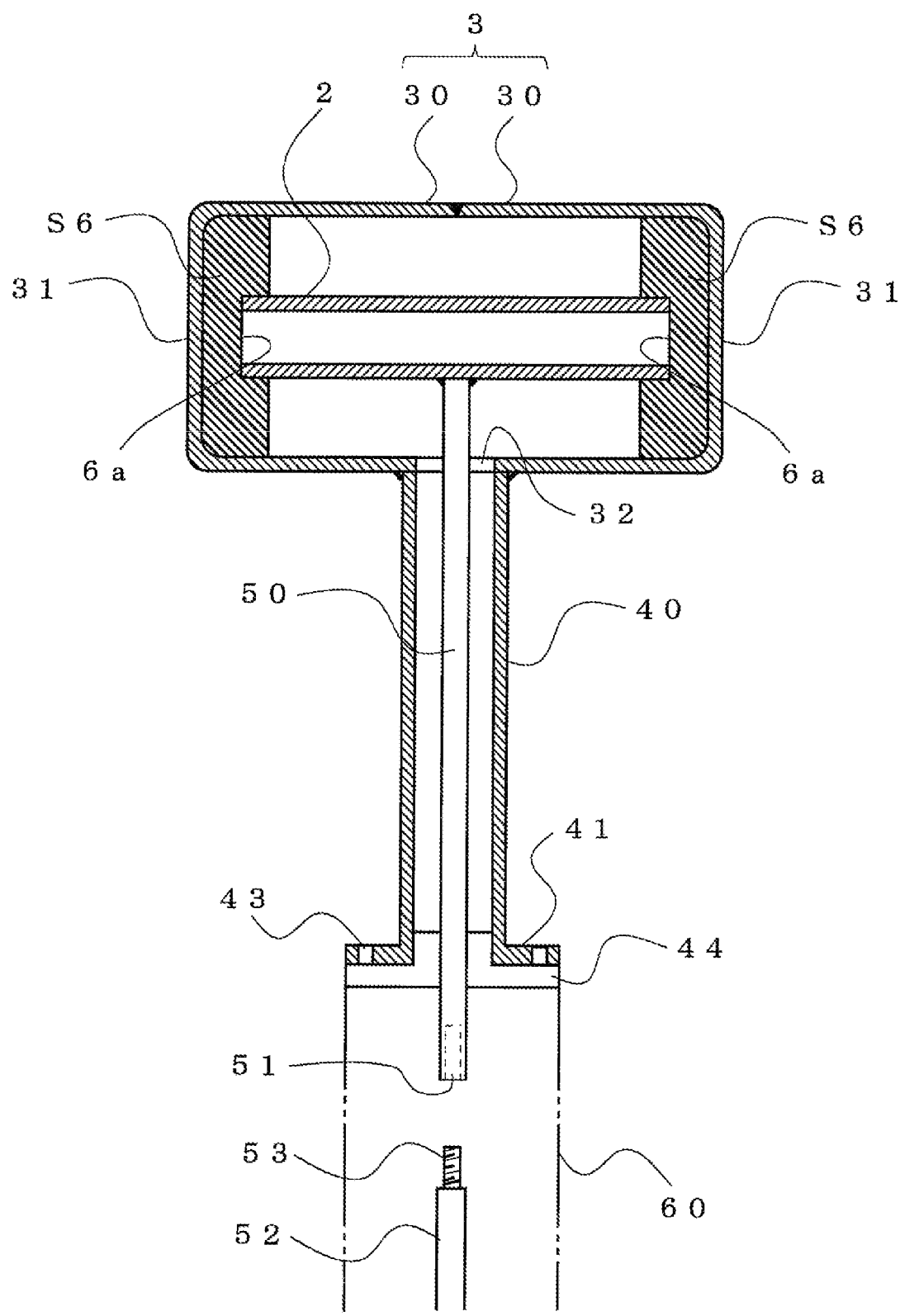
FIG. 8 is a longitudinal sectional view illustrating a fifth embodiment of a lightning suppression type lightning discharger of the invention.

FIG. 8 illustrates a fifth embodiment of the invention.

In this embodiment, an inner electrode body 2 and an outer electrode body 3 disposed in a horizontal direction, a cylindrical support 40 supporting the outer electrode body 3, and a conductive grounding member 50 connected to the inner electrode body 2 are included.

In the present embodiment, a cylindrically formed conductive pipe material is used for the inner electrode body 2. The outer electrode body 3 includes a pair of bottomed cylindrical members 30 and 30, each of which has an end surface 31 whose one end is close, and is formed by welding opening sides facing each other. The bottomed cylindrical members 30 and 30 may be screwed.

Spacers S6 and S6 made of an insulating material are provided on the inside of both end sides of the outer electrode body 3. Further, both ends of the inner electrode body 2 are held by the spacers S6 and S6. Recesses 6a and 6a are provided in both the spacers S6 and S6, and an end of the inner electrode body 2 is fit into the recess 6a.

A circular opening 32 is provided in a lower center (center of a peripheral wall) of the outer electrode body 3. The cylindrical support 40 is welded and fixed to the outer electrode body 3 so that an end edge thereof covers the periphery of the opening 32. The grounding member 50 extends downward through the inside of the cylindrical support 40. The grounding member 50 is provided with a flange 41 for connecting to a height adjusting member 60, etc. Reference numeral 43 denotes a bolt hole, and 44 denotes an insulating spacer.

A screw hole 51 is provided at a lower end of the grounding member 50. Reference numeral 52 denotes a grounding connection member connected to the grounding member 50, and an upper end thereof is provided with a male screw 53 screwed into and connected to the screw hole 51.

In this embodiment, it is possible not only to attempt to simplify the structure, reduce the weight, and improve the manufacturability, but also to extend a region in which the outer electrode body functions to the cylindrical support 40. In this way, it is possible to enhance the lightning suppression function.

INDUSTRIAL APPLICABILITY

The lightning suppression type arrester and the lightning discharger of the invention can be effectively used as lightning protection equipment that protects protected objects such as various buildings and structures, various equipment and communication equipment by suppressing lightning.

EXPLANATIONS OF LETTERS OR NUMERALS 1 (LIGHTNING SUPPRESSION TYPE) LIGHTNING DISCHARGER
2 INNER ELECTRODE BODY
2a SCREW PORTION
2b FEMALE SCREW PORTION
3 OUTER ELECTRODE BODY
3a INSERTION HOLE
4 SUPPORT
4a SCREW PORTION
5 PLATE
6 LOCK NUT
7 LOCK NUT
8 THROUGH-HOLE
20 LIGHTNING DISCHARGER
21 SUPPORT
22 INNER ELECTRODE BODY
22a SCREW PORTION
23 OUTER ELECTRODE BODY
24 LOCK NUT
25 PLATE
26 LOCK NUT
27 THROUGH-HOLE
40 CYLINDRICAL SUPPORT
50 GROUNDING MEMBER
52 GROUNDING CONNECTION MEMBER
60 HEIGHT ADJUSTING MEMBER
C THUNDERCLOUD
E GROUND
G GAP
S ELECTRICAL INSULATING LAYER
S1 SPACER
S2 SPACER
S3 SPACER
S4 SPACER
S5 SPACER
S6 SPACER
a SMALL-DIAMETER PORTION
b LARGE-DIAMETER PORTION
c SMALL-DIAMETER PORTION
d LARGE-DIAMETER PORTION
Z ARRESTER

What is claimed:

1. A lightning suppression type lightning discharger comprising:
an inner electrode body to be grounded;
an outer electrode body provided to surround the inner electrode body with a predetermined gap;
an electrical insulating layer provided in the gap to hold the inner electrode body and the outer electrode body in an electrically insulated state; and
a support that supports at least one of the inner electrode body and the outer electrode body,
wherein the inner electrode body is formed in a rod shape or a cylindrical shape, and the outer electrode body is formed in a cylindrical shape,
wherein the support is inserted into the outer electrode body from one longitudinal end thereof and coupled to the inner electrode body positioned inside the outer electrode body in an electrically conductive state, and a spacer made of an electrically insulating material for supporting the outer electrode body on the support is interposed between one end of the outer electrode body and the support.

2. The lightning suppression type lightning discharger according to claim 1, wherein the support radially penetrates the outer electrode body to protrude to an inside thereof and is coupled to the inner electrode body positioned inside the outer electrode body in an electrically conductive state, and a spacer made of an electrically insulating material for supporting the outer electrode body on the support is interposed in a penetrating portion between the support and the outer electrode body.

3. The lightning suppression type lightning discharger according to claim 1, wherein the electrical insulating layer is formed by spacers made of an electrically insulating material interposed between both ends of the inner electrode body and the outer electrode body, and a space portion formed by the spacers, the inner electrode body, and the outer electrode body.

4. The lightning suppression type lightning discharger according to claim 1, wherein the electrical insulating layer is formed by a spacer made of an electrically insulating material interposed in a gap between the inner electrode body and the outer electrode body.

5. The lightning suppression type lightning discharger according to claim 1, wherein a through-hole is formed in a side wall of the outer electrode body to communicate an inside and an outside thereof.

6. The lightning suppression type lightning discharger according to claim 2, wherein a through-hole is formed in a side wall of the outer electrode body to communicate an inside and an outside thereof.

7. The lightning suppression type lightning discharger according to claim 1, wherein a through-hole is formed in a side wall of the outer electrode body to communicate an inside and an outside thereof.

8. The lightning suppression type lightning discharger according to claim 3, wherein a through-hole is formed in a side wall of the outer electrode body to communicate an inside and an outside thereof.

9. The lightning suppression type lightning discharger according to claim 4, wherein a through-hole is formed in a side wall of the outer electrode body to communicate an inside and an outside thereof.

10. A lightning suppression type arrester formed by fixing the lightning suppression type lightning discharger according to claim 1 at a position where lightning is to be suppressed via the support and grounding the inner electrode body via the support.

11. A lightning suppression type arrester formed by fixing the lightning suppression type lightning discharger according to claim 2 at a position where lightning is to be suppressed via the support and grounding the inner electrode body via the support.

12. A lightning suppression type arrester formed by fixing the lightning suppression type lightning discharger according to claim 1 at a position where lightning is to be suppressed via the support and grounding the inner electrode body via the support.

13. A lightning suppression type arrester formed by fixing the lightning suppression type lightning discharger according to claim 3 at a position where lightning is to be suppressed via the support and grounding the inner electrode body via the support.

14. A lightning suppression type arrester formed by fixing the lightning suppression type lightning discharger according to claim 4 at a position where lightning is to be suppressed via the support and grounding the inner electrode body via the support.

15. A lightning suppression type arrester formed by fixing the lightning suppression type lightning discharger according to claim 5 at a position where lightning is to be suppressed via the support and grounding the inner electrode body via the support.

16. A lightning suppression type arrester formed by fixing the lightning suppression type lightning discharger according to claim 6 at a position where lightning is to be suppressed via the support and grounding the inner electrode body via the support.

17. A lightning suppression type arrester formed by fixing the lightning suppression type lightning discharger according to claim 7 at a position where lightning is to be suppressed via the support and grounding the inner electrode body via the support.

18. A lightning suppression type arrester formed by fixing the lightning suppression type lightning discharger according to claim 8 at a position where lightning is to be suppressed via the support and grounding the inner electrode body via the support.

19. A lightning suppression type arrester formed by fixing the lightning suppression type lightning discharger according to claim 9 at a position where lightning is to be suppressed via the support and grounding the inner electrode body via the support.

* * * * *